May 6, 1969　　　AKIHIKO SATO　　　3,442,192
MANUAL MIRROR AND PRESET APERTURE STOP CONTROL
DEVICE FOR SINGLE LENS REFLEX CAMERAS
Filed May 23, 1967

United States Patent Office 3,442,192
Patented May 6, 1969

3,442,192
MANUAL MIRROR AND PRESET APERTURE STOP CONTROL DEVICE FOR SINGLE LENS REFLEX CAMERAS
Akihiko Sato, Tokyo, Japan, assignor to Nippon Kogaku K.K., Tokyo, Japan, a corporation of Japan
Filed May 23, 1967, Ser. No. 640,707
Claims priority, application Japan, May 25, 1966, 41/48,693
Int. Cl. G03b 19/12
U.S. Cl. 95—42                 7 Claims

ABSTRACT OF THE DISCLOSURE

A mirror positioning device for a single lens reflex camera having a viewing mirror movable from a viewing position to an exposure position, and having a preset aperture stop control assembly on the objective lens. An interlock is provided between the mirror device and the preset aperture stop control comprising a mirror lever cooperating with a stud on the mirror and a pivotable transmission lever biased toward the mirror lever and cooperating with the preset aperture stop control assembly. There is also a manual control knob for selective manual control of either the viewing mirror or the preset aperture stop, or a third position in which both are activated automatically upon depression of the shutter button.

---

Figure 1:
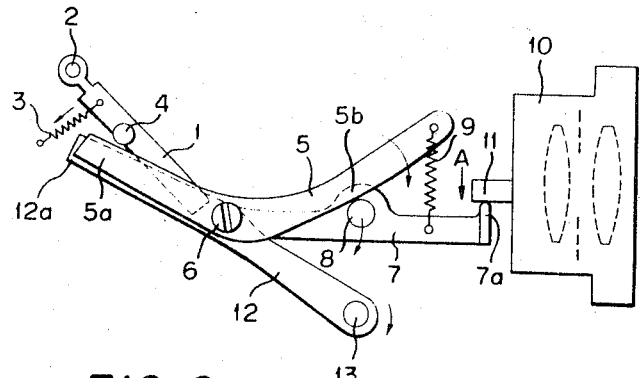

This invention relates to a mirror positioning device for single lens reflex cameras.

Single lens reflex cameras have been provided with mirror positioning devices, including quick return drive mechanisms, which are interlocked with the shutter means of the camera, including a mechanism permitting independent upward movement of the mirror. Most of such cameras are further provided with a preset aperture stop means which is adjusted to the prescribed stop size when the shutter means is operated in taking a picture. In the operation of such cameras, the depression of the shutter button initiates the operation of the drive mechanism for moving the mirror upwardly, at the same time operating the preset aperture stop means to the prescribed stop size. When the mirror has moved to its raised position, the shutter of the camera is tripped to expose the picture. Upon completion of the shutter operation, the mirror drive mechanism is tripped to return the mirror to its viewing or down position, at the same time permitting the preset aperture stop means to open the lens to its widest aperture.

In such mirror arrangements, there are two different systems for interlocking the spring drive means for raising the mirror and the drive mechanism. In the one, which is reversible, a fork groove and pin interlock is used, while in the other, which is unidirectional, a lever and pin interlock is used. In the first system which involves transmission of operation to the drive mechanism when the mirror is moved upwardly by the spring drive, there is the advantage of the preset aperture stop means being adjusted to the prescribed stop size in interlocking with the drive mechanism, however in this system, there is the disadvantage in the drive mechanism being held as long as the mirror is held in its raised position so that the shutter means cannot operate despite depression of the shutter button. In taking picture, therefore, with the mirror means being held in its raised position, for example, in taking pictures at higher speeds, microscopic pictures or pictures with use of shorter focal length objectives such as fish-eye lenses, the first system referred to is unsuitable. In addition, such system has another disadvantage of requiring at least two shutter release systems, of which one is independent of the drive mechanism to permit proper operation of the shutter means.

The second interlocking system though free from the disadvantage mentioned, has the disadvantages encountered in operating the preset aperture stop provided in the objective. In this second system, there are two ways of interlocking the drive mechanism and the preset aperture stop. In the one the drive mechanism transmission depresses the aperture stop lever of the objective to the prescribed stop size; while in the other, the aperture stop lever being previously biased in the stop control direction, follows the transmission means of the drive mechanism in rotation to the prescribed stop size. The pressure type interlock is open to the disadvantage of applying a violent mechanical shock on the stop control means, although advantageously free from the time lag in transmission; while in the follow-up type, the advantage of not applying a violent shock to the stop control means is offset by the disadvantage of a time lag in faster transmission.

However, the adoption of the unidirectional interlocking system, such as the lever-and-pin interlock between the spring drive and mirror referred to above, renders unsuitable the preferential follow-up type stop control because the operations of transmission means in the downward movement and the shutter are carried out at considerably higher speed since the drive mechanism is operating at nearly unloaded condition as long as the mirror is biased upwardly. This results in the stop control lever being unable to follow the operations and the shutter is operated before the stop control means sets the prescribed stop size.

On the other hand, if the operations of the raised mirror and the preset stop control means could be made substantially parallel with each other, fleeting opportunities for picture taking would not be missed since the time interval is minimized between the depression of the shutter button to the completion of the shutter operation.

The object of the present invention is to provide an improved mirror positioning means for a single lens reflex camera wherein an interlock is provided between the mirror drive means and the preset aperture stop control.

Figure 2:
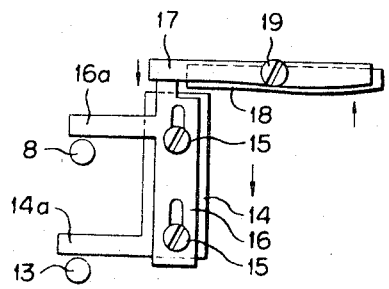
Figure 3:
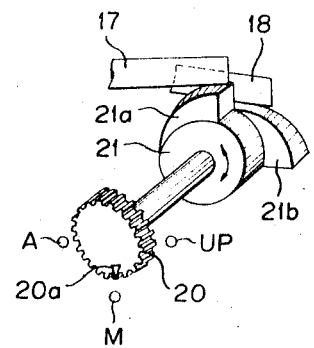
Figure 4:
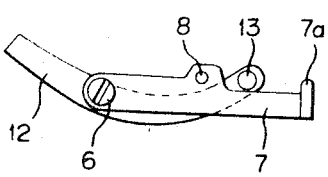
Figure 5:
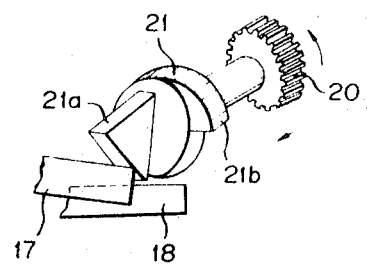

The invention will be described more in detail with references being made to illustrative embodiments shown in the drawing in which:

FIGURES 1 to 3 illustrate the structural features of the interlock embodying the invention, the objective camera lens and the aperture stop control being illustrated schematically, while FIGURES 4 and 5 other embodiments of the present invention.

Referring now to FIGS. 1 through 3, a viewing mirror 1 is pivoted within a camera casing (not shown) on a pin 2, the mirror being oscillatory between a viewing position as illustrated and a raised position. A spring 3, anchored at one end within the housing, is secured at its other end to the mirror 1 to bias the mirror clockwise to its viewing position. A stud 4 is secured in the side of mirror 1 and cooperates with a lever 5 pivotally supported on a pin 6.

The lever 5, hereinafter referred to as the mirror lever, is slightly curved, an arm 5a of the lever cooperating with the stud 4 in the manner of a cam and follower. The other arm 5b of the mirror cooperates in like manner with a stud 8 secured in a transmission arm 7 pivoted about one end on the pin 6. A spring interconnects the arm 5b of the mirror lever and the transmission arm tending to bias the two arms toward each other. The end of transmission arm 7 is provided with an abutment member 7a. An objective camera lens assembly 10 for the camera is illustrated schematically, it will be understood that the assembly 10 includes an automatic preset aperture stop control operated by a lever 11. As is well known in the art, a spring (not shown) within the aperture stop control biases the lever 11 downwardly in the direction indicated by the arrow A. The stop control lever is abutted by the abutment member 7a of the transmission lever when the mirror is in its viewing position as illustrated, to permit opening of the lens apertures. As will hereinafter appear, clockwise rotation of the transmission lever 7 will permit the stop control lever 11 to follow, to close the lens aperture to the prescribed opening.

It will be understood that the mirror lever 5 is rotated first in a clockwise direction and then in a counterclockwise direction by a quick return mirror drive device (not otherwise illustrated) which is well known in the art.

In operation of the mechanism thus far described, the mirror drive device is actuated in the well-known manner by depression of the shutter release button. The mirror lever 5 is rotated in a clockwise direction to rotate the mirror 1 counterclockwise to its raised position through the coaction of the mirror stud 4 and the mirror lever arm 5a. At the same time, the coaction of the mirror lever arm 5b with the stud 8 rotates the transmission lever 7 in a clockwise direction to permit operation of the preset aperture stop control to close the lens aperture to its prescribed opening. Upon shutter release, the mirror lever is rotated clockwise to return the mirror to its viewing position. The spring 9 moves the transmission lever counterclockwise to move the drive lever 11 upwardly to open the lens.

Pivoted on the pin 6 is also a manual mirror lever 12, one end 12a of the lever abutting the mirror stud 4 while the other end is provided with a stud 13. Positioned within the camera casing adjacent the mirror and transmission levers is a slidable interlocking plate 14 (FIG. 2) slidably mounted on guide pins 15 secured to an interlocking member 16. The interlocking plate 14 is provided with an extending arm 14a for abutting the manual mirror lever stud 13, while interlocking member 16 is provided with an extending arm 16a for engaging the transmission lever stud 8. The interlocking plate 14 and member 16 are so arranged that the interlocking member 16 moves downwardly with the interlocking plate 14 when the plate is moved downwardly.

Two interlocking levers 17 and 18 are pivoted on a common pin 19, the one end of each of the levers being adapted to engage the upper ends of the interlocking member 16 and interlocking plate 14, respectively. Cooperating with the two interlocking levers 17 and 18 is a mirror and aperture setting assembly controlled by a setting knob 20 extending from the camera body, for rotating a cam 21. The cam 21 is provided with two high points 21a and 21b which are engageable by the ends of the interlocking arms 17 and 18, respectively.

For manual control of the preset aperture stop, the control knob 20 is rotated to align the index 20a on the knob with an index M on the camera casing. This will bring the high point 21a under the end of lever 17 to rotate the lever counterclockwise. The other end of lever 17 moves the interlocking plate downwardly to rotate the transmission lever 7 clockwise thereby permitting the aperture stop lever 11 to be moved downwardly to close the lens aperture to the prescribed opening. Depression of the shutter button will cause the normal operation of the mirror drive and shutter mechanism in the usual manner. To bring about automatic preset aperture control, the setting knob 20 is returned to align the knob index with the index A on the camera casing.

To operate the camera with the mirror in its raised position, the index 20a is aligned with the index UP on the camera casing in which event the high point 21b of the cam will rotate the interlocking lever 18 counterclockwise to depress the interlocking plate 14. Arm 14a abutting stud 13 will be rotated clockwise to rotate the mirror counterclockwise to its raised position independently of the mirror drive means. The interlocking member 16 will be moved downwardly by plate 14 through the guide pins 15 to rotate the transmission lever 7 in the manner described, to permit the preset aperture stop control to set the lens opening to the prescribed size. Depression of the shutter release button under such conditions will initiate the now unloaded drive mechanism and the shutter release without fear of unsuitable exposures in spite of the fast operation of the transmission lever.

To permit normal operation of the camera, the knob 20 is returned to the A position.

In FIG. 4 of the drawings, the manual mirror lever 12 and the transmission lever 7 in slightly different forms are illustrated, pivoted on pins 6. The operation of the mechanism illustrated is the same as that hereinabove described.

In FIG. 5 there is illustrated another form for the control knob cam 21. In this instance the knob 20 is rotated for manual mirror control and pushed in for aperture stop control.

It will thus be seen that there is provided a manual aperture stop and mirror control for a single lens reflex camera which comprises few and simple parts, the use of which obviates the need for a second shutter release system, and whereby in the raised mirror position there are no uncertainties of exposure nor is any shock of impact transmitted to the aperture stop control during operation of the unloaded drive mechanism.

What is claimed is:

1. Mirror positioning device for a single lens reflex camera having a viewing mirror rotatable from a viewing position to a raised position by a mirror lever driven by a mirror drive, and having a preset aperture stop control assembly for the objective lens of the camera, the combination comprising the mirror lever, a stud on the mirror cooperating with the mirror lever, a pivotable transmission lever biased toward the mirror lever and cooperating with the preset aperture stop control assembly, the transmission lever being pivoted to operate the aperture stop control upon movement of the mirror to its raised position by the mirror lever, a pivotable manual mirror lever cooperating with the mirror stud, a movable interlocking plate cooperating with the manual mirror lever, a movable interlocking member cooperating with the transmission lever, and means for moving the interlocking member to pivot the transmission lever to operate the preset aperture stop control, said means including means to move the interlocking plate for pivoting the manual mirror lever to pivot the mirror to its raised position and to move the interlocking member to operate the preset aperture stop control assembly by the transmission lever.

2. Mirror positioning device according to claim 1, wherein a pin is provided forming the pivotal axes for the mirror lever, the transmission lever, and the manual mirror lever.

3. Mirror positioning device according to claim 1, wherein a stud is provided on the transmission lever and on the manual mirror lever, and the interlocking plate and interlocking member are each formed with an extension arm for abutting the studs on the transmission lever and manual mirror lever, respectively.

4. Mirror positioning device according to claim 1, wherein the interlocking plate and the interlocking member are slidable, guide pins in the interlocking plate for slidably mounting the interlocking member thereon, the interlocking member being independently movable, the movement of the interlocking plate moving the interlocking member.

5. Mirror positioning device according to claim 1, wherein the means for moving the interlocking member and the interlocking plate includes two pivoted interlocking levers, cam means for each of the interlocking levers, and a setting knob for positioning the cam means to rotate the interlocking levers selectively for moving the interlocking member and the interlocking plate.

6. Mirror positioning device according to claim 1, wherein the interlocking plate and the interlocking members are slidable, guide pins in the interlocking plate for slidably mounting the interlocking member thereon, the interlocking member being independently movable, the movement of the interlocking plate moving the interlocking member; a stud on the transmission lever and on the manual mirror lever, and an extension arm on the interlocking plate and on the interlocking member for abutting the studs on the transmission lever and manual mirror lever, respectively.

7. Mirror positioning device according to claim 6, wherein the means for moving the interlocking member and the interlocking plate includes two pivoted interlocking levers, cam means for each of the interlocking levers, and a setting knob for positioning the cam means to rotate the interlocking levers selectively for moving the interlocking member and the interlocking plate.

References Cited

UNITED STATES PATENTS

| | | | |
|---|---|---|---|
| 3,062,118 | 11/1962 | Starp | 95—42 |
| 3,165,042 | 1/1965 | Higuchi | 95—42 |
| 3,165,992 | 1/1965 | Ando | 95—42 |
| 3,185,058 | 5/1965 | Singer | 95—42 |
| 3,221,626 | 12/1965 | Fuketa | 95—42 |

NORTON ANSHER, *Primary Examiner.*

C. B. FUNK, *Assistant Examiner.*